(12) United States Patent
Pitre

(10) Patent No.: US 8,252,181 B2
(45) Date of Patent: Aug. 28, 2012

(54) HORIZONTAL ORE FILTER WITH REPLACEABLE FILTER ELEMENTS

(76) Inventor: Gerald Pitre, Big River (CA)

(*) Notice: Subject to any disclaimer, the term of this patent is extended or adjusted under 35 U.S.C. 154(b) by 631 days.

(21) Appl. No.: 12/078,209

(22) Filed: Mar. 28, 2008

(65) Prior Publication Data
US 2009/0020469 A1 Jan. 22, 2009

Related U.S. Application Data

(60) Provisional application No. 60/929,956, filed on Jul. 19, 2007.

(51) Int. Cl.
*B01D 33/00* (2006.01)
*B01D 33/17* (2006.01)

(52) U.S. Cl. ......... 210/330; 210/331; 210/345; 210/499

(58) Field of Classification Search .................. 210/232, 210/330, 344, 345, 346, 486, 359, 331, 498, 210/499, 324
See application file for complete search history.

(56) References Cited

U.S. PATENT DOCUMENTS

| | | | |
|---|---|---|---|
| 2,588,912 A | 3/1952 | Denhard | |
| 2,798,612 A | 7/1957 | Crumb | |
| 3,080,063 A | 3/1963 | Krynski et al. | |
| 3,361,262 A | 1/1968 | Orr et al. | |
| 3,485,375 A | 12/1969 | Lee | |
| 3,587,862 A * | 6/1971 | Lee | 210/330 |
| 4,391,706 A * | 7/1983 | Steinkraus | 210/232 |
| 4,539,114 A * | 9/1985 | Mention et al. | 210/330 |
| 4,578,192 A * | 3/1986 | Muller | 210/486 |
| 4,680,911 A * | 7/1987 | Davis et al. | 52/521 |
| 5,084,174 A * | 1/1992 | Perala et al. | 210/331 |
| 5,310,482 A * | 5/1994 | Sather | 210/485 |
| 5,360,541 A * | 11/1994 | Gerakios | 210/232 |
| 5,792,349 A * | 8/1998 | Buettner et al. | 210/232 |
| 6,186,340 B1* | 2/2001 | Hirs | 210/411 |
| 2004/0238439 A1* | 12/2004 | Oglesby | 210/483 |

FOREIGN PATENT DOCUMENTS

GB 1134025 A * 11/1966

* cited by examiner

*Primary Examiner* — Tony G Soohoo
*Assistant Examiner* — Peter Keyworth
(74) *Attorney, Agent, or Firm* — Palmer C. DeMeo; Mario Theriault

(57) ABSTRACT

The horizontal ore filter has a plurality of filter elements covering the circular filter surface thereof and a sub-frame supporting the filter surface. In one aspect, each filter element has a longitudinal concave curvature therein. In another aspect, each sector frame has side flanges thereon. The sub-frame has a plurality of T-bars extending radially along the circular filter surface and each one of these T-bars supports the side edges of two adjacent filter elements. Upon installation of the filter elements to the sub-frame, the sector frames are held tight against the T-bars to ensure a good seal between adjacent filter elements and between each filter element and the sub-frame of the machine.

3 Claims, 10 Drawing Sheets

HORIZONTAL ORE FILTER WITH REPLACEABLE FILTER ELEMENTS

This application claims the benefit of U.S. Provisional Application No. 60/929,956, filed Jul. 19, 2007.

FIELD OF THE INVENTION

The present invention pertains to a horizontal ore filter with replaceable filter elements, and more particularly it pertains to replaceable filter elements that are sealed against the sub-frame of a horizontal ore filter.

BACKGROUND OF THE INVENTION

In a certain step in a mining process, water is extracted from wet ore material for washing out some undesired elements from the minerals, for example. This process step is carried out on an ore filter table. This type of filter is referred to as a horizontal ore filter. A plan view and an elevation view of a typical horizontal ore filter are illustrated in the accompanying drawings in FIGS. 1 and 2 respectively.

Examples of these filters are also described and illustrated in the following prior art documents:

U.S. Pat. No. 2,588,912 issued to H. W. Denhard on Mar. 11, 1952;
U.S. Pat. No. 2,798,612 issued to C. W. Crumb, on Jul. 9, 1957;
U.S. Pat. No. 3,080,063 issued to J. Krynski et al., on Mar. 5, 1963;
U.S. Pat. No. 3,361,262 issued to D. S. Orr et al., on Jan. 2, 1968;
U.S. Pat. No. 3,485,375 issued to G. Lee on Dec. 23, 1969;
U.S. Pat. No. 5,360,541 issued to M. Gerakios on Nov. 1, 1994.

A horizontal ore filter has a circular shape and its surface is covered by a series of filter segments 20, each having the shape of a sector of a circle. Each filter segment 20 is made of a perforated plate 22. The entire surface of the filter surface is covered by a filtering fabric 24 such as a canvas, a felt or another filtering material of the like. The filtering fabric 24 is made of a large piece covering several or all segments 20 at once. Generally, the filtering fabric 24 is attached to the filter segments 20 in a way that is illustrated in FIGS. 3 and 4, in the accompanying drawings.

Each filter segment has a channel 26 around its perimeter, and the filtering fabric 24 is retained to this channel by means of a rope 28 tucked into this channel 26. In many of the prior art models of horizontal ore filters, the channel 26 is welded, such as shown at 30, to a sub-frame 32 of the ore filter.

In use, a load of wet ore material is spread over the filter surface and a vacuum pressure is applied under the filter surface to extract water and fine particles from the ore material. The ore material is then picked up by a screw-type rotor and transferred to the next station of a treatment process. The operation of a horizontal ore filter is not further explained herein because this aspect of the ore filter is not the focus of the present invention.

It is known however, that the filter surface is exposed to friction wear due to the ore aggregate being spread there over and recovered therefrom in bulk by a rotor passing a very short distance from the surface of the filtering fabric. It is also known that generally, the entire filter surface must be renewed every six months or so, at a great expense. It is known that an overhaul of one of these filters requires the replacement of the filtering fabric 24 as well as the replacement of the channels 26 and the perforated plates 22 on some of, or on all the filter segments 20.

The replacement of the filter segments 20 of the prior art consists of pulling the rope 28 from the channels 26; removing the filter fabric 24, and then gouging out the welds 30 from the damaged perforated plates 22 to separate the plates from the sub-frame 32. This work is done by workers standing on the structure of the filter.

The pulling of the rope 28 is particularly dangerous, because the rope 28 often breaks or give away suddenly, thereby causing the person pulling on it to become out of balance and to fall down from the structure of the filter. The filtering fabric 24 can also be stuck to the perforated plate and give away suddenly when it is pulled up, also causing accidents. Therefore, the replacement of filter fabrics from the filter surface is a difficult and dangerous task. Moreover, the overhauling of the filter surface keeps the machine out of service for an extended period of time.

One difficulty in finding a safer and more productive method for fastening the filtering fabric to the surface of the ore filter is that the rope-and-groove method of the prior art is very effective in sealing any gap between adjacent surface sectors. The efficiency of the filtering process depends on an airtight mounting of each surface segment to the sub-frame of the ore filter. Therefore the obtainment of a better airtight mounting of each surface sector in particular, using a different structural configuration, has been a challenge in the past.

In some instances, such as the ore filter described in the U.S. Pat. No. 3,361,262 mentioned before, independent segments are made with the aforesaid channel extending all around. These segments are removably mounted to a sub-frame. The segments are bolted at both ends to the sub-frame. Caulking is placed between the sectors of the filter surface to provide a seal across the filter surface.

These segments are subject to vibration, and because they are only supported from underneath along their lengths, theses vibrations cause vibration waves to travel there along. These vibration waves cause accelerated wear on the fabric material for reducing the gap between the filter fabric and the equipment overhead. These vibration waves also cause a loss of vacuum under the filtering surface, and between the filter segments, when the caulking material between the segments has hardened and cracked for example.

Although there is a need in this market for a safer procedure to replace worn-out filtering fabrics, any new method must encompass a structure that provides a good seal across the entire filter surface. The sealing aspect of an ore filter having replaceable filter segments is the main focus of the present invention.

SUMMARY OF THE INVENTION

In the ore filter according to a general aspect of the present invention, each surface sector of the filter surface is covered by a filter element that is independently replaceable. Each filter element is fastened to a sub-frame in such a way as to maintain a positive pressure between the edges thereof and the sub-frame of the ore filter. A good vacuum under the filtering surface is thereby efficiently maintainable without having recourse to caulking or welding.

In another more specific aspect of the present invention, there is provided a horizontal ore filter having a circular filter surface comprising a plurality of filter elements covering the circular filter surface, and a sub-frame supporting the filter surface. Each filter element has a longitudinal concave curvature therein. The sub-frame has a plurality of straight T-bars extending radially along the circular filter surface and each one of these T-bars supports the side edges of two adjacent filter elements. Upon installation of the filter elements to the sub-frame, the filter elements are forced down against the sub-frame to straighten the aforesaid curvature, thereby positively holding the sector frame against the sub-frame to ensure a good seal between adjacent filter elements and between the filter elements and the sub-frame of the machine.

This type of pre-stressed mounting prevents any loosening of the filter element in use, due to vibration, and prevents any upward deflection in the filter element due to fatigue stresses.

In yet another specific aspect of the present invention, there is provided a filter element that is clamped down to the sub-frame along all sides thereof, using clamping blocks and clamping bars. Deflection and vibration waves along the filter element are thereby prevented, and a good seal is efficiently maintainable across the entire filter surface.

This brief summary has been provided so that the nature of the invention may be understood quickly. A more complete understanding of the invention can be obtained by reference to the following detailed description of the preferred embodiments thereof in connection with the attached drawings.

In the following description and illustrations, reference is made to two preferred embodiments which are related to the use of a short sector frame and a long sector frame respectively. In both embodiments, there is provision to clamp down the side edges of both the long and the short sector frame to a sub-frame of an ore filter.

BRIEF DESCRIPTION OF THE DRAWINGS

Two embodiments of the horizontal ore filter having removable filter elements are illustrated in the attached drawings. In these drawings the same numerals are used to identify the same parts. In the drawings.

DETAILED DESCRIPTION OF THE PREFERRED EMBODIMENTS

Figure 1:
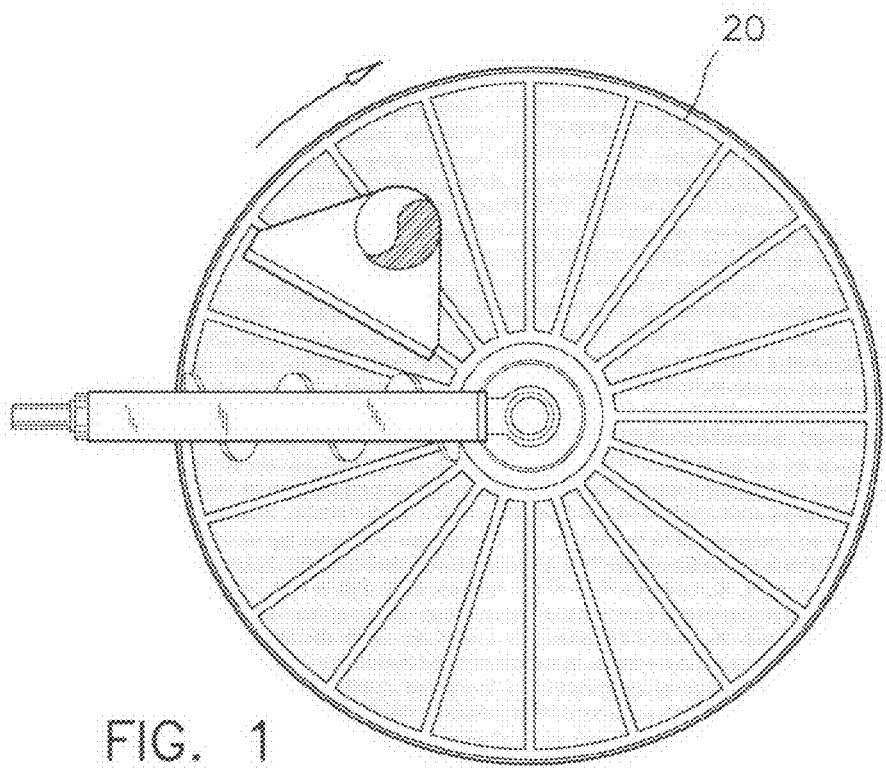
FIG. 1 is a plan view of a horizontal ore filter of the prior art.
Figure 2:
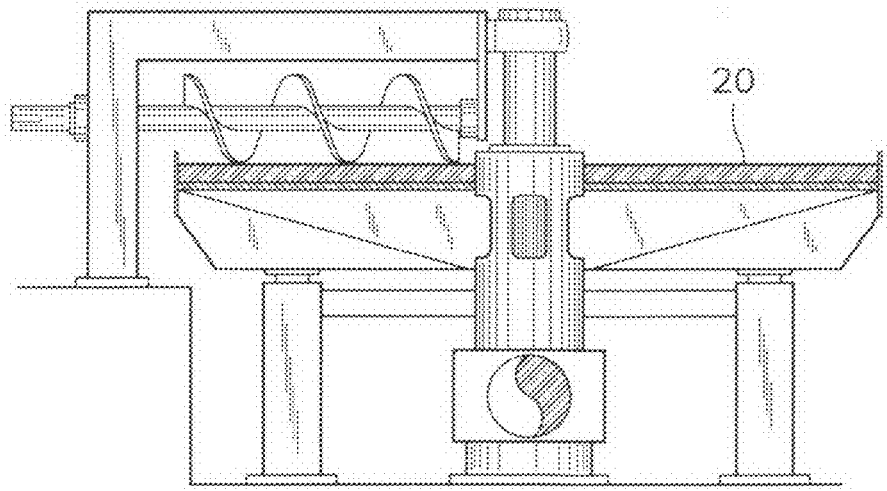
FIG. 2 is an elevation cross-section view of the ore filter of the prior art.
Figure 3:
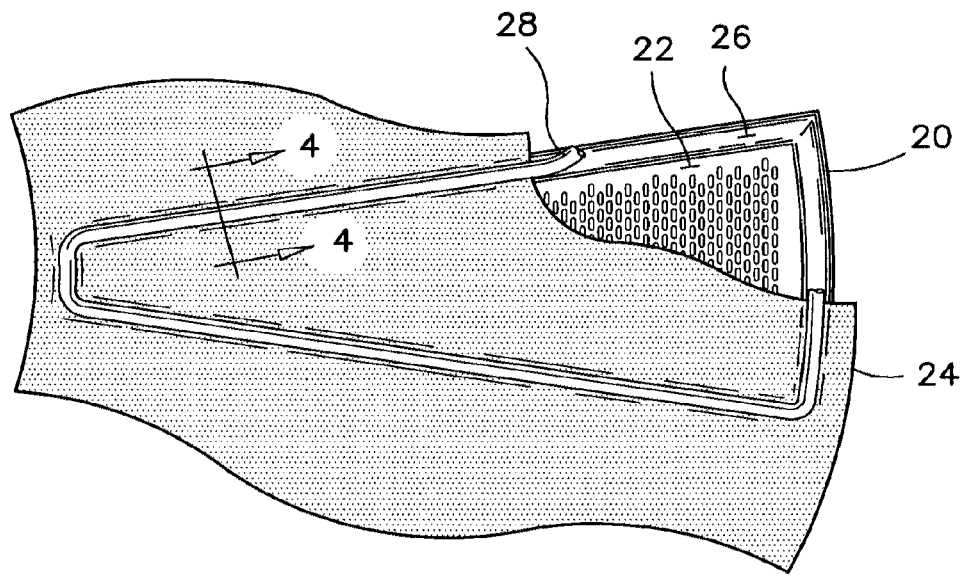
FIG. 3 is a plan view of a filter segment on the ore filter of the prior art.
Figure 4:
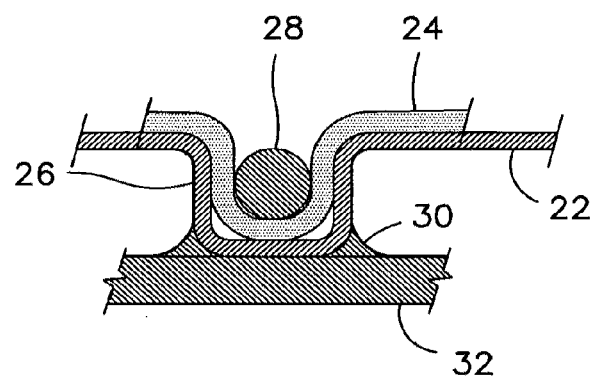
FIG. 4 is a cross-section view of an edge of the filter element on the ore filter of the prior art, as seen along line 4-4 in FIG. 3.

While this invention is susceptible of embodiment in many different forms, there are shown in the drawings and will be described in details herein, two specific embodiments of a removable filter element for mounting on a horizontal ore filter. It should be understood that the present disclosure is to be considered as an example of the principles of the invention and is not intended to limit the invention to the embodiments illustrated and described.

Figure 5:
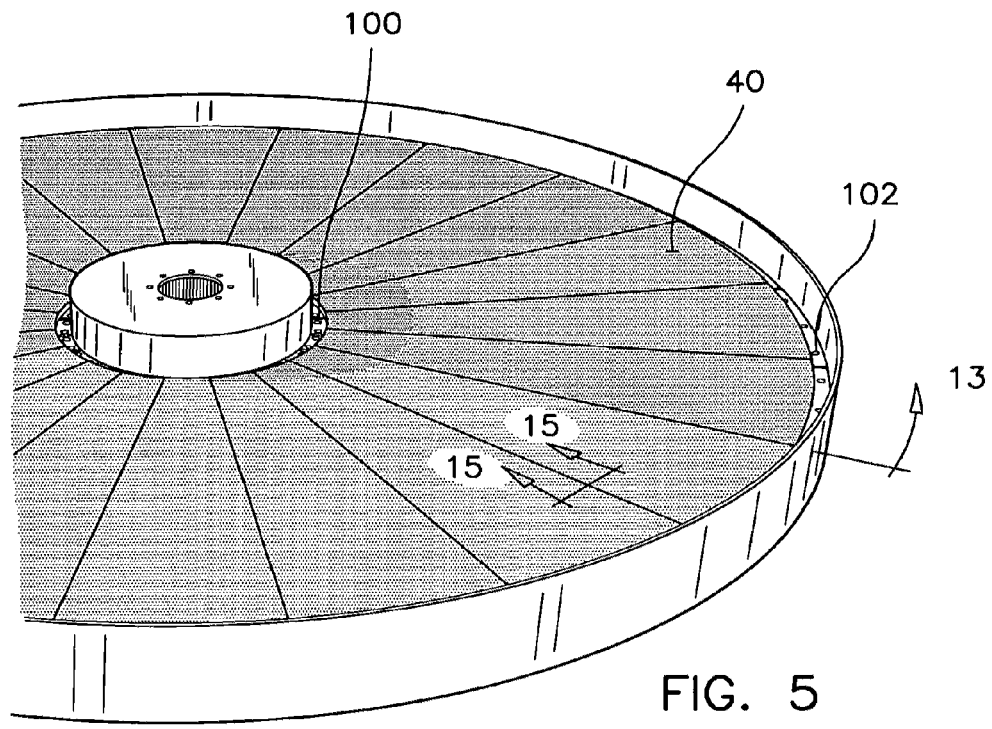
FIG. 5 is a partial perspective view of a horizontal ore filter having removable filter elements according to a first embodiment of the present invention mounted thereon.
Figure 6:
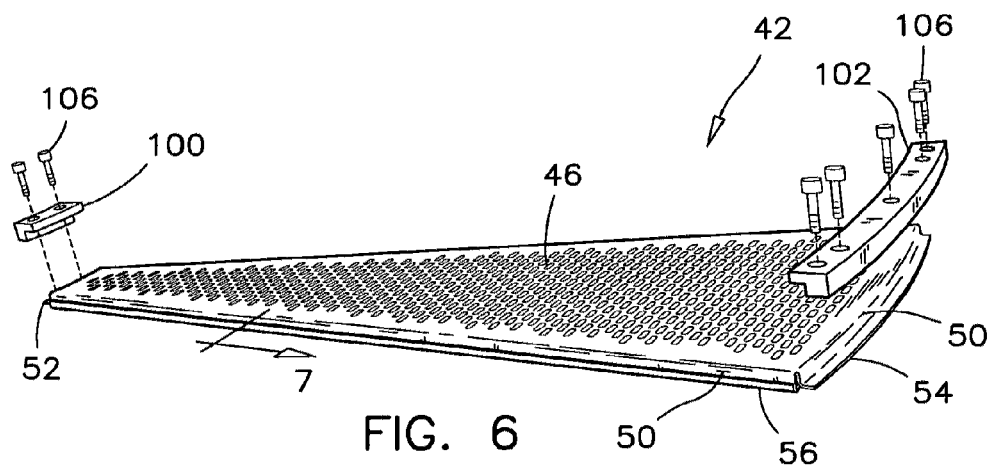
FIG. 6 is a perspective view of a short sector frame according to the first embodiment of the present invention.
Figure 7:
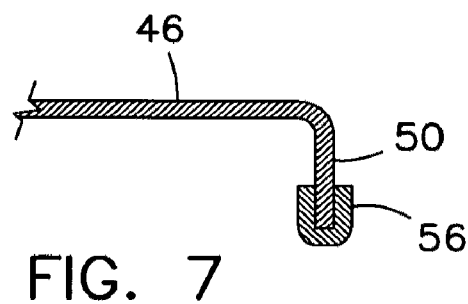
FIG. 7 is a cross-section view through the edge of the short sector frame as seen along line 7 in FIG. 6.

On a horizontal ore filter such as illustrated in FIG. 5, having removable filter elements according to one or more aspects of the present invention, each filter element 40 has the shaped of a sector of a circle. As can be seen in FIG. 6, each filter element 40 has a metal core which is referred to as a sector frame 42. The sector frame 42 illustrated in FIG. 6 is referred to as the short sector frame 42. A long sector frame will be presented later as another embodiment.

In use, each short sector frame 42 is covered by a fabric filter cover, as will also be explained later. A short sector frame 42 has a flat perforated upper surface 46, which is enclosed on all sides by a curved lip 50. The lips 50 define the thickness of the filter element 40.

Referring to FIGS. 6-9, the narrow and wide ends of each short sector frame 42 have end flanges 52 and 54 respectively formed thereon, on their respective lips 50. Both side lips 50 are covered by a rounded moulding 56. A similar moulding 56' is also optionally installed along the edge of the end flanges 52 and 54.

Figure 8:
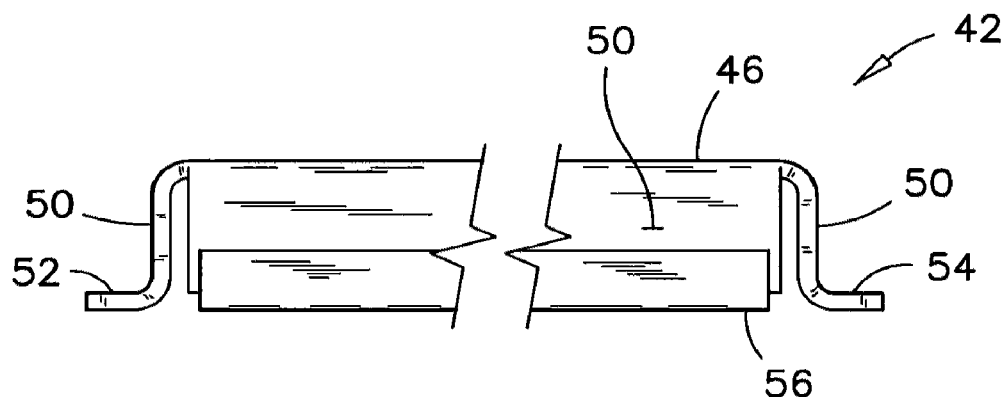
FIG. 8 is a partial side view of the short sector frame illustrated in FIG. 6.
Figure 9:
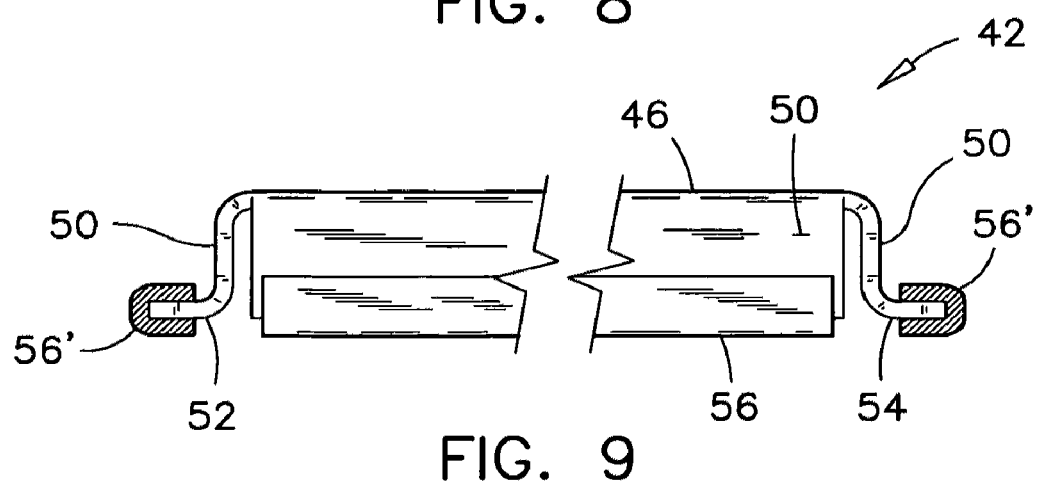
FIG. 9 is another partial side view of a short sector frame, showing an alternate arrangement of the end flanges on that sector frame.
Figure 10:
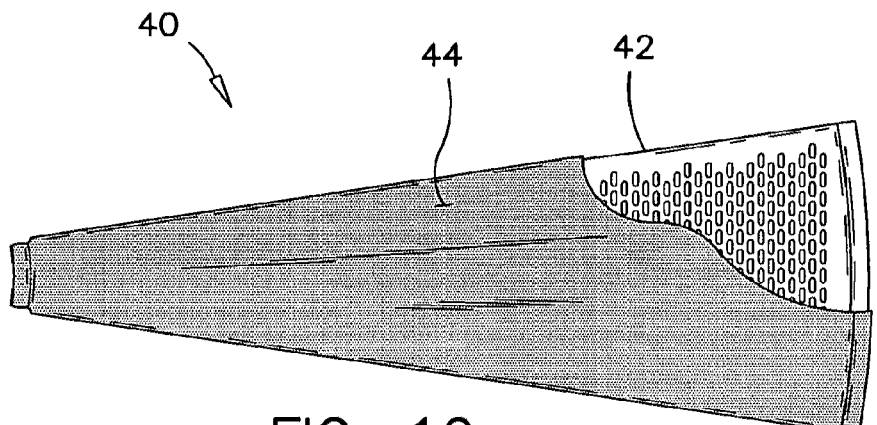
FIG. 10 is a plan view of a first type of removable fabric filter cover that is mountable over the short or the long sector frame according to the first or second preferred embodiment of the present invention respectively.

When the short sector frames 42 are used without moulding 56' on the end flanges 52, 54, the height of the lips 50 on the ends of the short sector frame 42 are made to match the depth of the side lips 50 with a moulding 56 thereon as illustrated in FIG. 8.

A first purpose of the mouldings 56, 56' is the reduce or eliminate the need for grinding and smoothing the edges on the side lips 50 and end flanges 52, 54. It is also to prevent damaging the fabric filter cover 44 during installation of the fabric filter cover over the short sector frame 42, and in use. Thirdly, the use of the mouldings 56, 56' is to seal each filter element 40 to the sub-frame of the ore filter, to prevent air or water from seeping between the filter elements 40 in use.

Referring now to FIGS. 5 and 10-12, the first type of fabric filter cover 44 for installation on a short sector frame 42 will be explained in greater details. Each fabric filter cover 44 is made to cover the upper perforated surface 46 of a short sector frame 42, and to enclose the side lips 50.

The first type of fabric filter cover 44 has a bag-like shape wherein the short sector frame 42 can be easily introduced therein. The first type of fabric filter cover 44 has a closed upper surface 60 and a partly closed back surface 62. The back surface 62 may also have straps 64 and buckles, as shown, or laces, a zipper or elastic bands (not shown) to tighten the fabric around the short sector frame 42. Both ends of the bag-like fabric filter cover 44 have flaps 66, 68 which have dimensions to enclosed a central portion of the end flanges 52 and 54 respectively, and be fastened to the back surface 62 of the fabric filter cover 44.

Each flap 66, 68 preferably has hook and loop fasteners 70 thereon to attach to mating fasteners 70 on the back surface 62 of the fabric filter cover 44 for retaining the flaps over the end flanges 52 and 54 and to the back surface 62.

Referring now to FIGS. 13-17, the mounting of a filter element 40 to a supporting structure will be explained. Each filter element 40 is supported to a supporting structure comprising an array of straight T-bars 90. The T-bars 90 are oriented radially relative to the surface of the ore filter, as it may be understood from FIG. 5.

The T-bars 90 are strong enough to support a load of ore material on the filter surface without bending. The T-bars 90 are not exposed to abrasion from the ore material being spread over the filter surface or recovered from the filter surface.

Figure 15:
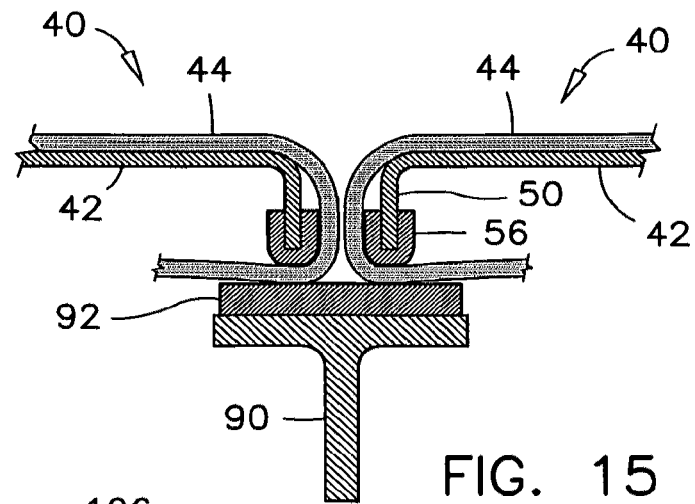
FIG. 15 is a cross-section view through the adjacent edges of two filter elements, as seen substantially along line 15-15 in FIG. 5.

Each T-bar 90 supports juxtaposed side edges of a pair of filter elements 40, as it may be understood from FIG. 15. A rubber pad 92 or strip is mounted over the surface of each T-bar 90. The fabric of the fabric filter cover 44 is held tight between the rubber pad 92 and the mouldings 56 on the lips 50, for sealing the filter elements 40 to the array of T-bars 90.

Figure 11:
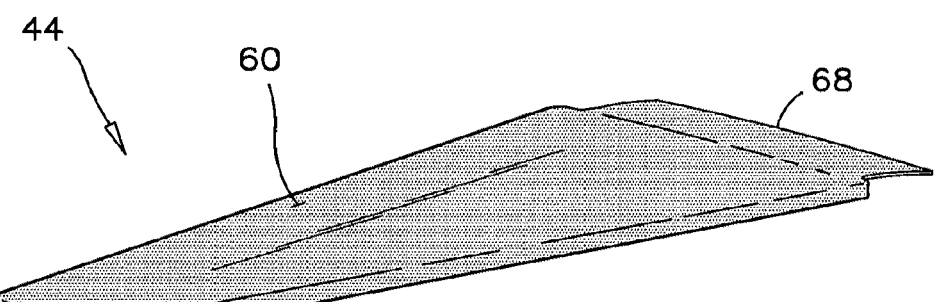
FIG. 11 is a perspective top view of the first type of fabric filter cover for covering the sector frame of a filter element.
Figure 12:
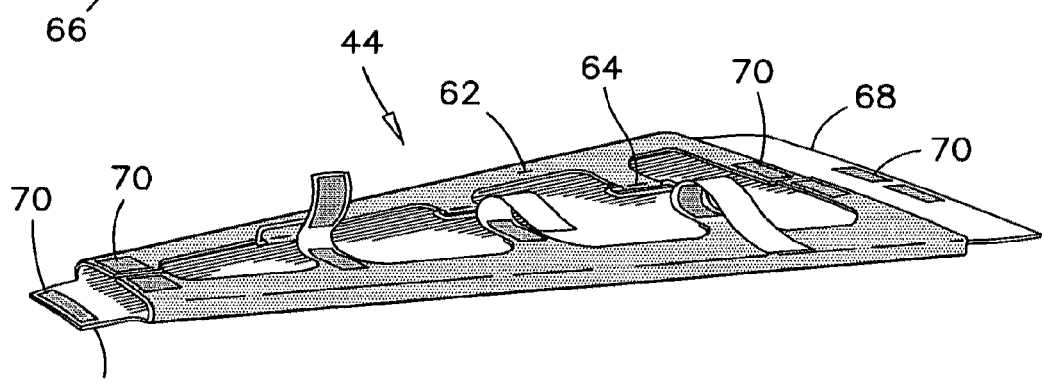
FIG. 12 is a perspective bottom view of the fabric cover shown in FIG. 11.
Figure 17:
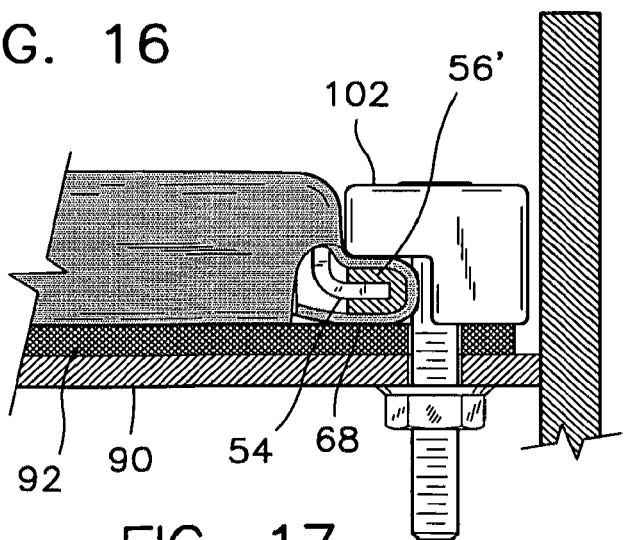
FIG. 17 is an enlarged view of the mounting of the wide end of a removable filter element, as illustrated in detail circle 17 in FIG. 14, to the sub-frame of the ore filter shown in FIG. 5.

Referring to FIGS. 11, 12 and 17, both flaps 66, 68 on the filter cover 44 do not cover the full width of the flanges 52 and 54, to prevent the presence of a double layer of fabric between any one of the mouldings 56 and the rubber pads 92.

Although a rubber pad 92 and rubber mouldings 56, 56' are mentioned herein, the rubber material is not essential. Other compressible materials such as felt, foam or leather can be used for the purpose of sealing all gaps between the filter elements 40 and the T-bars 90.

Figure 13:
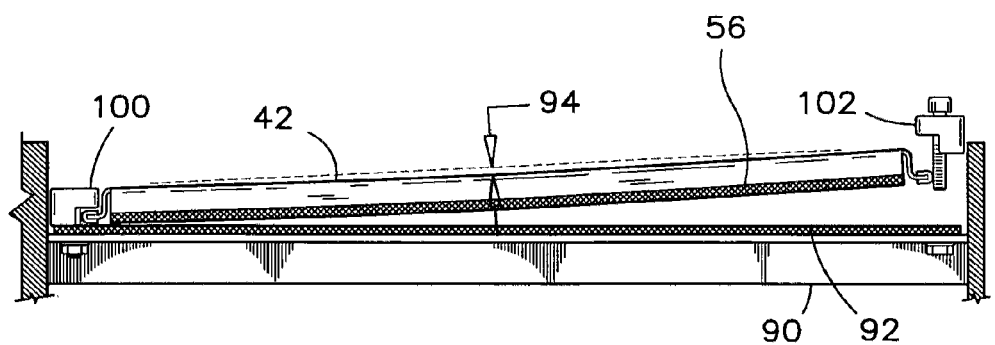
FIG. 13 is a cross-section view through the ore filter as illustrated in FIG. 5, substantially as seen along radial line 13 in FIG. 5, during the installation of a filter element, wherein the fabric cover has not been illustrated for clarity.

Each short sector frame 42 is formed with a slight upward bend or a concave curvature 94 along its longitudinal axis as illustrated in FIG. 13. During installation, one end of the filter element 40 is fastened to structure of the ore filter by means of retaining block 100 or retaining bar 102. The other end is forced down against the sub-frame of T-bars 90 and is retained there by the retaining block 100 or bar 102.

The purpose of this concave curvature 94 is to create, in use, an uniform pressure along the entire length of the short sector frame 42, and to pre-stress the filter element 40 in a flat shape against the T-bars 90. This pre-stressing of the filter elements 40 against the T-bars 90 prevents the filter elements from bowing upwardly after extended use, and ensures a good seal between the rubber pads 92 and each filter element 40, along the full length of each filter element. This pre-stressing of the sides of the filter element 40 also prevents any vibration wave from setting into, and from travelling along, the filter element, to break the vacuum at the contacts surface between the filter element 40 and the supporting T-bars 90.

Figure 16:
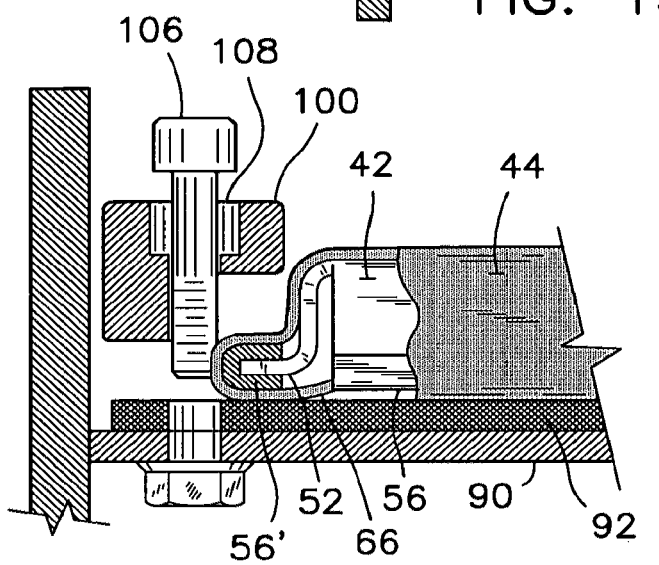
FIG. 16 is an enlarged view of the mounting of the narrow end of a removable filter element, as illustrated in detail circle 16 in FIG. 14, to the sub-frame of the ore filter shown in FIG. 5.

The retaining block 100 and retaining bar 102 are preferably bolted to the sub-frame of the ore filter by socket-head-type screws 106, the head of which extend into mating recesses 108 in the retaining block and retaining bar. The retaining block 100, and retaining bar 102 preferably have a shaped surface to clamp the corresponding end flange 52, 54 without tilting, as illustrated in FIGS. 16 and 17.

Figure 14:
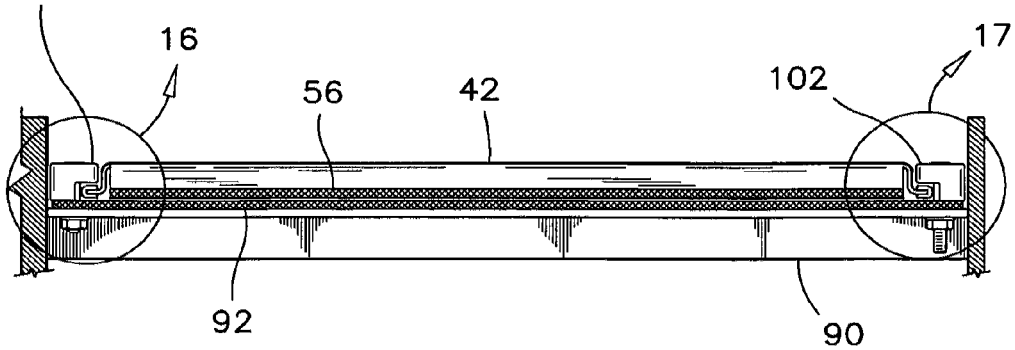
FIG. 14 is a cross-section view through the ore filter as illustrated in FIG. 5, substantially as seen along radial line 13 in FIG. 5.

The screws 106 on one of the blocks are longer than those on the other block as shown in FIGS. 13, 14 and 17 to accommodate the concave curvature 94 mentioned above and to provide a range of displacement for tensioning the filter element 40 against the sub-frame of T-bars 90.

There are two common sizes of ore filter in the industry. The first one is referred to as a thirteen foot diameter filter and the second is referred to as a seventeen foot diameter filter. The curvature 94 mentioned before is efficient in providing the required pressure and a good seal between the short sector frame 42 and the sub-frame of T-bars 90 for sealing the filter elements 40 to the sub-frame of a thirteen foot diameter ore filter.

Figure 18:
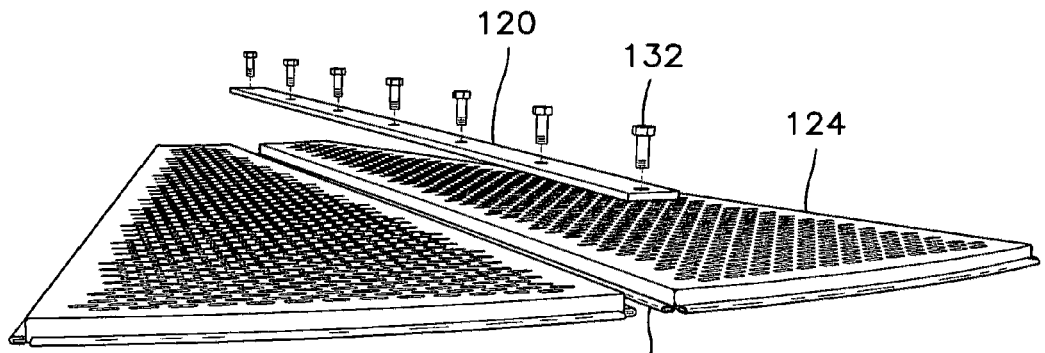
FIG. 18 is a perspective view of a pair of juxtaposed long sector frames according to a second preferred embodiment of the present invention.
Figure 19:
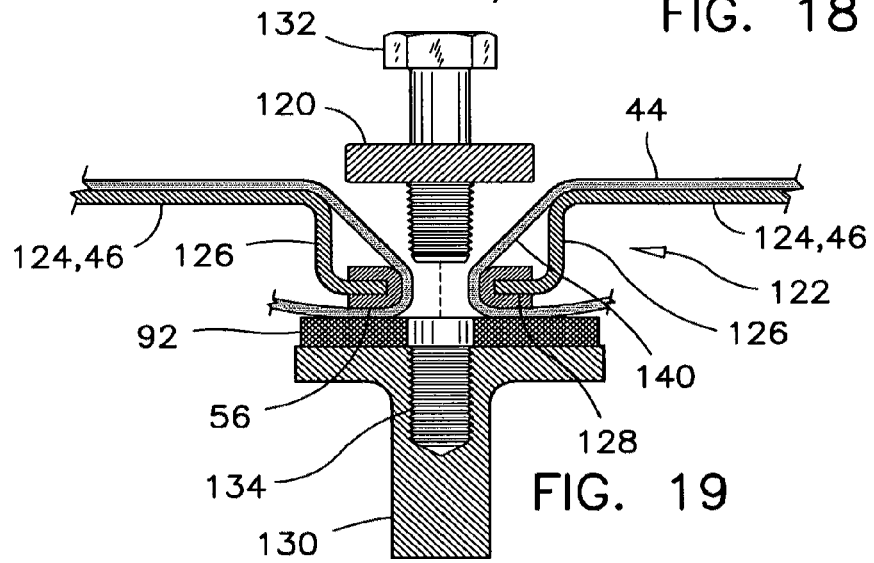
FIG. 19 is an exploded cross section view through the adjacent edges of two filter elements, with the long sector frames according to the second preferred embodiment, as seen substantially along line 15-15 in FIG. 5 when the ore filter has the long sector frames mounted thereon.
Figure 20:
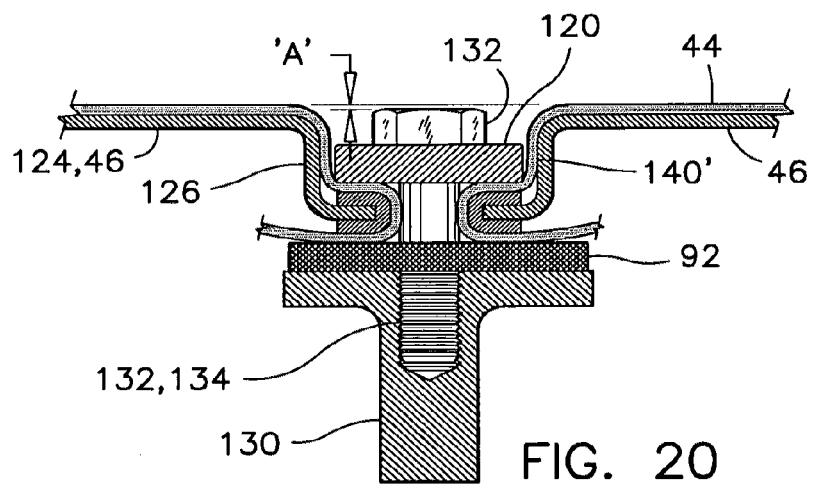
FIG. 20 is a fully assembled cross-section view of the assembly shown in FIG. 19.
Figure 21:
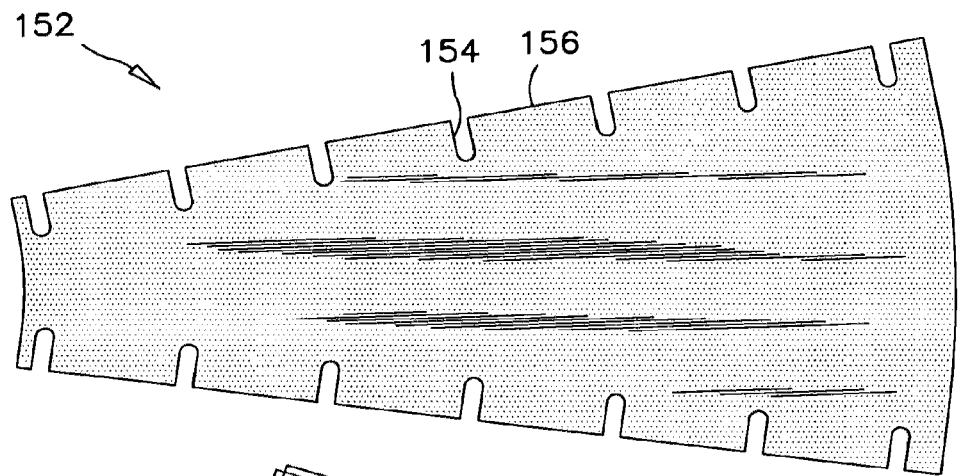
FIG. 21 is a plan view of a second type of filter fabric cover for installation on a long sector frame.
Figure 22:
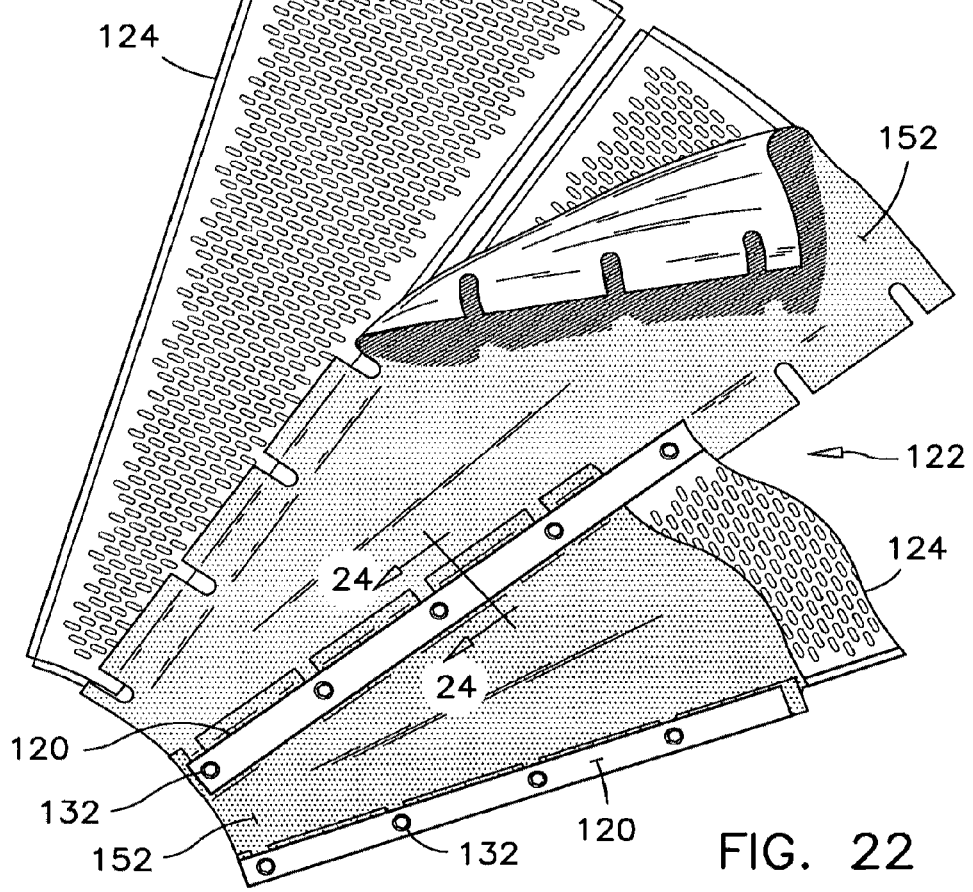
FIG. 22 is a plan view of juxtaposed long sector frames with the second type of filter fabric being installed on these sector frames.

Referring now to FIGS. 18-20, a second preferred embodiment will be explained. When longer sector frames 124 are used and mounted on a larger ore filter, it is advantageous to install clamping bars 120 on both sides of a filter element to hold down both sides of a long sector frame 124 to the sub-frame. It will be appreciated that the clamping bars 120 can be used on a long sector frame having the aforesaid curvature 94 as well, to provide additional clamping pressure between the filter element and the sub-frame.

The lip along the edges of the long sector frame 124 forms a knee-type rim 122 having a vertical portion 126 and a horizontal portion 128. The horizontal portion 128 is referred to as a side flange and is preferably covered by a rubber moulding 56 for the same reasons as explained before. In use, a pair of juxtaposed side flanges 128 and mouldings 56 are held tight against a modified T-bar 130 by a clamping bar 120. A series of bolts 132 are threaded into a series of threaded holes 134 in the leg of the modified T-bar 130. The bolts are used to pull each clamping bar 120 against a supporting T-bar 130 to clamp the side flanges 128 of two adjacent long sector frames 124 to the supporting T-bar 130.

A rubber pad 92 can also be used on the clamping surface of each modified T-bar 130 to improve a sealing of the filter element 40 against the sub-frame of the ore filter.

The fabric filter cover 44 that is used with the long sector frame 124 is the same as mentioned previously and illustrated in FIGS. 10-12. The advantage of the knee-type rim 122 in this case, is that the fabric filter material extends over the right angle groove of the rim like a string on a bow. The filter material extending over the right angle groove is pulled by the clamping bar 120 into the right angle groove of the rim 122 as shown by label 140', for stretching the filter fabric 44 over the perforated upper surface 46 of the long sector frame 124.

The clamping bar 120 also retains the material of the fabric filter cover 44 against the rubber moulding 56 to prevent any movement of the filter fabric material over the long sector frame 124. It will also be appreciated that a series of clamping bars 120 are installed to hold the contiguous edges of all adjacent filter elements 40 over the entire surface of an ore filter.

The height of the rim 122 in the long sector frame 124 is determined so that the height of the heads on bolts 132 is less than the depth of the filter element 40, as illustrated by label 'A' in FIG. 20.

Referring now to FIGS. 21-24, another type of fabric filter cover 152 is illustrated therein. The second type of fabric filter cover 152 is made for replacement without removing the long sector frames 124 from the sub-frame of the ore filter. This fabric cover 152 is made as a single sheet which is wider and longer than a long sector frame 124. It has transverse slots 154 along each side thereof, for avoiding the bolts 132 holding a clamping bar 120. These slots define a series of tabs 156 along each side of the fabric cover sheet 152.

Figure 23:
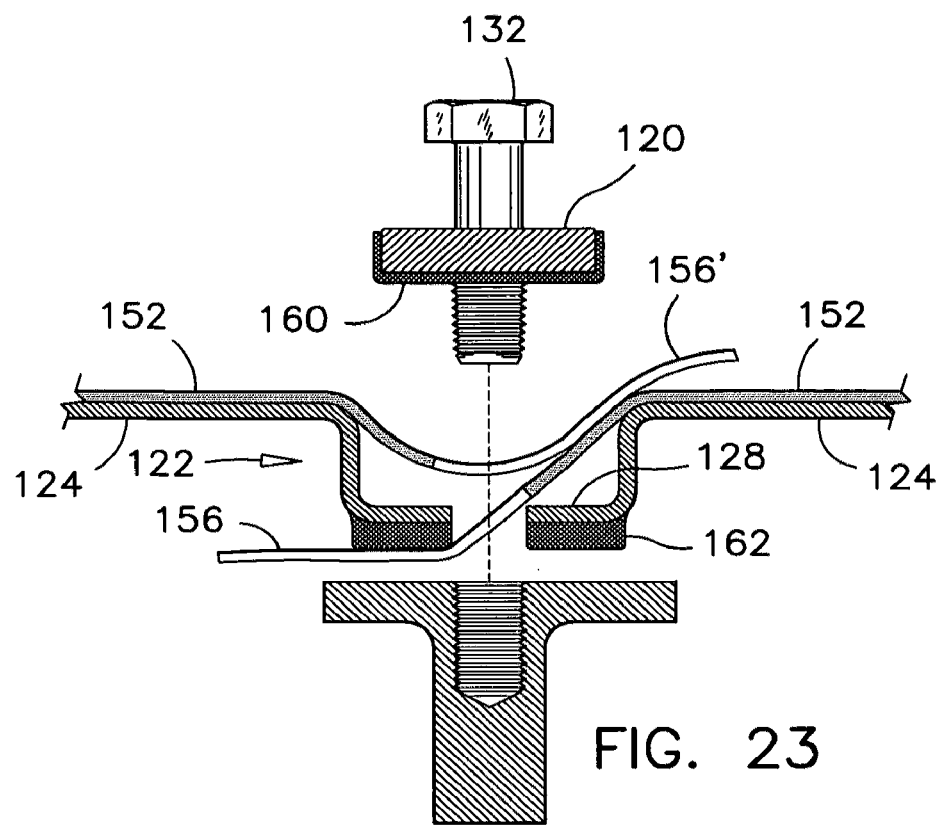
FIG. 23 is an exploded cross section view through the adjacent edges of two filter elements having the long sector frames, as seen substantially along line 15-15 in FIG. 5 when the ore filter has the long sector frames mounted thereon.
Figure 24:
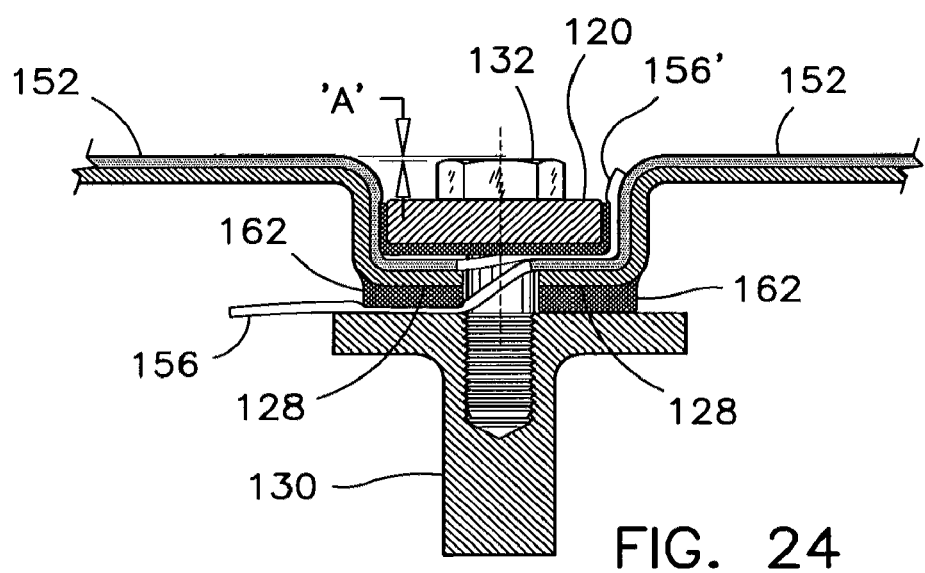
FIG. 24 is a fully assembled cross-section view of the assembly shown in FIG. 23.

The installation of a fabric cover sheet 152 is done by inserting the tabs 156 along one side of the sheet 152 under the side flange 128 of a first sector frame 124. The tabs 156' on the other side of the fabric cover sheet 152 are laid over the edges of two adjoining sector frames 124, under the clamping bar 120. When the clamping bar is installed into the slot formed by the rims 122 of two adjacent sector frames 124 as shown in FIGS. 23 and 24, the material of the fabric cover is forced into the right-angle groove of the rims 122 to tighten the fabric cover 152 over the surface of the sector frames 124. Before the ore filter is put to use, the excess lengths in the tabs 156' are cut off below the surface of the filter element as shown in FIG. 24.

In order the enhance to pulling of the filtering fabric 152 over the surface of the sector frame 124, the clamping bar preferably has a layer of rubber material 160 vulcanized on its lower surface and side edges.

In order to enhance the sealing of the sector frames 124 to the T-bar 130, each side flange 128 of the sector frame 124 preferably has a block of rubber material 162 bonded to it as shown in FIGS. 23 and 24. Although these blocks of rubber 162 are not essential, they are advantageous for ensuring an even pressure and a good seal along the edges of the sector frames 124.

It will be appreciated that both the short and long sector frames 42, 124 have their perimeters held tight to the sub-frame of the ore filter such as to created an airtight mounting of all the filter elements to the sub-frame of T-bars.

What is claimed is:

1. An ore filter having:
   a sub-frame comprising an array of frame members;
   a plurality of juxtaposed filter elements mounted to said sub-frame in a circular array along a horizontal plane; each of said filter elements having a sector-like shape, a perforated upper surface, and a piece of filtering material laid over and singly covering said perforated upper surface;
   said plurality of juxtaposed filter elements comprising pairs of juxtaposed filter elements; each of said pairs of juxtaposed filter elements having a pair of bordering sides and a space between said bordering sides;
   each of said bordering sides having a flat flange; and said flat flanges in said pair of bordering sides extending horizontally in a same plane toward each other in said space; said flat flanges in said pair of bordering sides being laid flat side-by-side upon one of said frame members in said array of frame members;
   each of said bordering sides having a lip extending between said perforated upper surface on a respective one of said filter elements in said pair of juxtaposed filter elements, and said flat flange on said bordering side in said respective one of said filter elements in said pair of juxtaposed filter elements; said lip extending downwardly and defining a depth of said respective one of said filter elements in said pair of juxtaposed filter elements; said lips and said flat flanges on said pair of bordering sides defining a pair of facing right-angle grooves in said space;
   a rectangular flat bar laid in said space and in said pair of facing right-angle grooves over said pieces of filtering material on said filter elements in said pair of juxtaposed filter elements; and
   a plurality of spaced bolts extending vertically through said rectangular flat bar and through said one of said frame members for clamping said rectangular flat bar, said pair of bordering sides and said pieces of filtering material on said filter elements in said pair of juxtaposed filter elements to said one of said frame members;
   said pieces of filtering material on said filter elements in said pair of juxtaposed filter elements comprising a first and second pieces of filtering material;
   each of said first and second pieces of filtering material having a first position extending diagonally across a respective one of said right-angle grooves like a string on a bow, and a second position laying against said lip and said flat flange in a respective one of said right-angle grooves;
   said first position of said first piece of filtering material being a mirror image of said first position of said second piece of filtering material; and said second position on said first piece of filtering material being a mirror and simultaneous image of said second position of said second piece of filtering material,
   said first and second positions being associated with a pre-mounting and a mounting of said bolts through said one of said frame members, respectively; and said first and second positions being associated with less and more tension, respectively in said first and second pieces of filtering material over said perforated upper surfaces of said filter elements in said pair of juxtaposed filter elements.

2. The ore filter as claimed in claim 1, wherein said one of said frame members is a T-bar and said plurality of bolts extends through a head portion of said T-bar and is threaded into a leg portion of said T-bar.

3. The ore filter as claimed in claim 2, wherein each of said flat flanges extends parallel to and at a distance from said perforated upper surface and said plurality of bolts extends perpendicularly to said perforated upper surface, and wherein a thickness of each of said rectangular flat bars and a bolt head on one of said plurality of bolts is less than said distance.

* * * * *